United States Patent
Kilbride et al.

(10) Patent No.: US 11,576,373 B2
(45) Date of Patent: Feb. 14, 2023

(54) CRYOPRESERVATION APPARATUS AND METHODS

(71) Applicant: Asymptote Ltd., Cambridge (GB)

(72) Inventors: Peter James Kilbride, Cambridge (GB); Stephen Lamb, Cambridge (GB); George John Morris, Cambridge (GB)

(73) Assignee: Asymptote Ltd., Cambridge (GB)

( * ) Notice: Subject to any disclaimer, the term of this patent is extended or adjusted under 35 U.S.C. 154(b) by 256 days.

(21) Appl. No.: 16/500,534

(22) PCT Filed: Mar. 28, 2018

(86) PCT No.: PCT/GB2018/050812
§ 371 (c)(1),
(2) Date: Oct. 3, 2019

(87) PCT Pub. No.: WO2018/185467
PCT Pub. Date: Oct. 11, 2018

(65) Prior Publication Data
US 2020/0045958 A1    Feb. 13, 2020

(30) Foreign Application Priority Data
Apr. 7, 2017  (GB) ..................... 1705652

(51) Int. Cl.
*A01N 1/02*    (2006.01)
*F25D 31/00*   (2006.01)

(52) U.S. Cl.
CPC ......... *A01N 1/0257* (2013.01); *A01N 1/0268* (2013.01); *A01N 1/0221* (2013.01);
(Continued)

(58) Field of Classification Search
CPC .. A01N 1/0257; A01N 1/0268; A01N 1/0221; A01N 1/0278; F25D 31/00; F25D 2400/28
See application file for complete search history.

(56) References Cited

U.S. PATENT DOCUMENTS 5,084,377 A    1/1992  Rowan et al.
9,417,166 B2 * 8/2016  Thorne ................ A01N 1/0268
(Continued)

FOREIGN PATENT DOCUMENTS

CN    101381703 A    3/2009
CN    102599146 A    7/2012
(Continued)

OTHER PUBLICATIONS

Meredith Duffy, Shear thinning, Fall 2011, Soft-Matter, First paragraph (Year: 2011).*
(Continued)

*Primary Examiner* — Lionel Nouketcha
(74) *Attorney, Agent, or Firm* — Eversheds Sutherland (US) LLP

(57) ABSTRACT

Apparatus are provided for preventing the formation of ice crystals in a biological sample containing a non-Newtonian fluid as a cryopreservation medium. The apparatus may be used to prevent ice formation during cryopreservation of biological samples, or during warming of cryopreserved biological samples, by changing the viscosity of the non-Newtonian fluid. The apparatus (200) comprises a housing (202) for a container (212) containing the biological sample (214) and the non-Newtonian fluid, and a device (204) for inducing a change in viscosity of the cryopreservation medium. The change in viscosity may be increased by inducing shear thickening of the cryopreservation medium, or the change in viscosity may be decreased by inducing shear thinning of the cryopreservation medium. Possible
(Continued)

viscosity-changing devices comprise a tapping device, a piston, a rotating device, a compression device, a sound generating device, a permanent magnet or a electromagnetic field generating device. The apparatus may further include a temperature control device.

41 Claims, 8 Drawing Sheets

(52) U.S. Cl.
CPC ............ *A01N 1/0278* (2013.01); *F25D 31/00* (2013.01); *F25D 2400/28* (2013.01)

(56) References Cited

U.S. PATENT DOCUMENTS

| | | | |
|---|---|---|---|
| 2007/0114488 A1* | 5/2007 | Jackson | B23Q 11/1053 252/71 |
| 2009/0098577 A1* | 4/2009 | Edris | C12Q 1/37 435/7.4 |
| 2014/0260346 A1 | 9/2014 | Fuhr et al. | |

FOREIGN PATENT DOCUMENTS

| | | |
|---|---|---|
| CN | 103759483 A | 4/2014 |
| EP | 1428008 B1 | 1/2012 |
| WO | 2006/041951 A2 | 4/2006 |
| WO | 2017/072499 A1 | 5/2017 |

OTHER PUBLICATIONS

Chinese Office Action for CN Application No. 201880037889.7 dated May 19, 2021 (24 pages with English translation).
PCT International Search Report and Written Opinion for PCT Application No. PCT/GB2018/050812 dated Jul. 2, 2018 (12 pages).
Great Britain Search Report for GB Application No. 1705652.4 dated Oct. 9, 2017 (5 pages).
Dorr et al., "Noninvasive Quality Control of Cryopreserved Samples," Biopreservation and Biobanking, 2012, 10:529-531.
Wowk, "Thermodynamic Aspects of Vitrification," Cryobiology, 2010, 60:11-22.

* cited by examiner

CRYOPRESERVATION APPARATUS AND METHODS

CROSS REFERENCE TO RELATED APPLICATIONS

This application claims the priority benefit of PCT/GB2018/050812 filed on Mar. 28, 2018, which claims priority benefit of Great Britain Patent Application No. 1705652.4 filed on Apr. 7, 2017, the entire contents of which are hereby incorporated by reference herein.

FIELD OF THE INVENTION

The present invention generally relates to apparatus, methods and systems for preventing ice formation during cryopreservation of biological samples, or during warming of cooled/cryopreserved biological samples. In particular, the present invention provides apparatus for preventing the formation of ice crystals in a biological sample containing a non-Newtonian fluid as a cryopreservation medium.

BACKGROUND TO THE INVENTION

Biological materials (e.g. cells, vaccines, tissues, and proteins) often need to be preserved. For example, biological materials may need to be preserved so that they can be studied or used in scientific experiments at a later point in time. In another example, human oocytes or fertilised embryos may be preserved as part of the in vitro fertilisation (IVF) process. In these examples, it is important that the biological material is preserved in such a way that damage to, or degradation of, the biological material is minimised. Cooling techniques are often used to preserve biological material. There are different ways to cool biological materials in order to preserve them. For example, cryopreservation is a process in which biological material is cooled to very low temperatures (e.g. $-80°$ C. or $-196°$ C.) and then stored in a cooled state, while freeze drying (lyophilisation) is a process in which a biological sample is frozen and following the freezing step, water is removed from the sample, such that the sample is stored in a dried state.

Cryopreservation is a widely employed technology used to maintain long term viability of biological samples for subsequent application in medicine, biotechnology and veterinary sciences. In order to obtain high viability upon warming a cryopreserved sample, it is necessary during the cryopreservation process to add protective compounds to biological samples, also known as cryoprotective additives, and then to cool the samples at controlled rates. Cryopreservation generally involves cooling samples to, and maintaining them for prolonged periods at, very low temperatures, for example $-80°$ C., $-136°$ C. or $-196°$ C. By cooling a biological sample to a low temperature the kinetics of chemical or enzymatic reactions that would otherwise degrade the sample are slowed to such an extent that the sample no longer degrades or only degrades at very slow rate. As a result, biological samples can be stored over prolonged periods and then brought back to ambient temperature as required for use and/or analysis.

The cooling process can, however, have detrimental effects on a biological sample and to mitigate these effects a number of techniques for cryopreservation have been developed, albeit all of these techniques have intrinsic limitations. Traditional cryopreservation techniques involve controlled cooling and results in the formation of ice crystals. An alternative ice free technique, vitrification, avoids the formation of ice crystals during cooling and instead involves solidification of water into an amorphous glass.

Damage to biological samples during cryopreservation processes mainly occurs during the cooling/freezing stage and the warming stage. Solution effects, extracellular ice formation, intracellular ice formation, membrane effects, solute toxicity and dehydration can all lead to sample damage. Some of these effects can be reduced by introducing compounds with known protective impact during the cryopreservation cycle. Compounds with a protective impact during cryopreservation are referred to as cryoprotectants or cryoprotective additives (CPAs).

There are various stresses that a biological sample can encounter during cryopreservation, examples of these stresses and their effects on a cellular level include i) reduction in temperature—can potentially cause changes in the membrane lipid phase and/or depolymerisation of the cytoskeleton; ii) increase in solute concentration, e.g. the concentration of solute in solution increases as a proportion of the solvent freezes—can lead to osmotic shrinkage; iii) increase in ionic concentration—can have a direct effect on membranes including the solubilisation of membrane proteins; iv) dehydration—can cause destabilisation of the lipid bilayers; v) precipitation of salts and eutectic formation—can cause cellular damage though mechanisms not well understood; vi) gas bubble formation—can cause mechanical damage; vii) increase in viscosity—may effect diffusion processes including osmosis; viii) pH changes—can cause denaturation of proteins etc.; and ix) cells become closely packed—can cause membrane damage. There is therefore a need for cryopreservation techniques that minimise exposure of biological samples to these various stresses.

In standard cryopreservation techniques, sometimes referred to as conventional or equilibrium cryopreservation, cells or biomass are cooled at a specific rate either in a controlled rate freezer or a cheaper device such as a Mr Frosty or a CellCool. As the sample temperature descends below its equilibrium melting point ice begins to form (nucleate) and ice crystals then spread from the nucleation point throughout the sample, often causing irreparable damage. As the ice formation process proceeds biological samples such as cells concentrate in solute-dense channels between the ice, until these channels themselves solidify (through vitrification), and the samples are then stored at their designated storage temperatures.

These ice-present cryopreservation techniques are generally considered unsuitable for the preservation of tissues and organs due to the direct ice damage that can occur. In simple terms, ice crystals can expand between, or grow into, cells, causing destruction of the tissue macrostructure and, consequently, the function of the tissue. In practical terms, although some extracellular ice can be supported in organs and tissues, intracellular ice is almost always fatal to cells.

Although conventional cryopreservation is a proven technique for a large number of applications, its application is generally restricted to suspensions of cells or small aggregates. For biopsy samples greater than around 1 mm$^3$ in volume such as tissues, organs, or multicellular organisms, unacceptable damage to the material occurs during the freezing and thawing due to ice damage.

Vitrification, in contrast to equilibrium cryopreservation, is an ice-free cryopreservation technique. Various mechanisms are exploited in vitrification to avoid ice growth on cooling. Vitrification relies on bringing a sample resident in a vitrification/cryopreservation medium to below the glass transition temperature (Tg) of that vitrification/cryopreservation medium without allowing ice crystals to form. At temperatures below the glass transition the viscosity of the system increases and the solvent/medium eventually solidifies to deliver a stable sample in which the biological material resides within a low temperature matrix of amorphous solid vitrification/cryopreservation medium.

Cryopreservation through vitrification usually entails adding a cryoprotectant (CPA) containing cryopreservation medium to a biological sample prior to cooling that reduce the freezing temperature of the medium and aqueous components of the sample and also increase the viscosity of the aqueous components of the sample so that ice crystal formation during cooling below the equilibrium freezing point is avoided and the transition between the liquid to the solid state does not involve crystallisation. Vitrification of biological samples however typically requires rapid cooling, for example cooling rates of 10,000° C./min or more and this intrinsically limits the approach to very small sample sizes. Typically, vitrification samples are presented in a straw with an internal diameter of 1 mm or less. For larger samples it is very difficult to obtain vitrification.

Vitrification may also be achieved with a combination of rapid cooling and simultaneous application of high pressure, but this involves high cost and requires skilled operators. Addition of high concentrations of solutes such as dimethylsulphoxide (DMSO) in the vitrification process before cooling can be useful, however toxicity of the resultant solutions to biological samples is often observed, while perfusion/diffusion of these high-viscosity liquids into complex tissues can be difficult.

Vitrification (ice free cryopreservation) of mammalian embryos and oocytes in small volumes of liquid has been demonstrated to be effective at retaining cell viability and function. However, despite extensive research, vitrification of larger biological samples to retain viability and function upon warming has not been demonstrated, primarily this appears to be a result of the practical difficulties in achieving rapid enough cooling/warming rates, avoiding ice nucleation and minimising cryoprotectant toxicity.

Many tissues and tissue engineered organs do not have any shelf life after removal from a patient or culture. This leads to waste and damages the economy of techniques using these materials, and as such Just-in-Time manufacture is usually not feasible for tissue engineered constructs.

Accordingly, the present applicant has recognised the need for improved apparatus for preventing ice formation during cryopreservation of biological samples and during warming/liquifying of cryopreserved biological samples.

SUMMARY OF THE INVENTION

According to a first aspect of the present invention, there is provided an apparatus for preventing the formation of ice crystals during a cryopreservation process, the apparatus comprising: a housing for a container containing a biological sample and a non-Newtonian fluid as a cryopreservation medium; and a device for inducing a change in viscosity of the cryopreservation medium.

In embodiments, the device comprises: a tapping device for applying a force to the biological sample in the container.

The tapping device may comprise: at least one rod; and an actuating element coupleable to the at least one rod to raise and lower the rod into proximity with a surface of the biological sample in the container. The rod may impact the surface of the biological sample, or a surface of the container, or an intermediate layer provided between the rod and the surface of the biological sample.

The tapping device may comprise: a plurality of rods; and at least one actuating element coupleable to the plurality of rods to raise and lower the rods into proximity with a surface of the biological sample in the container.

At least a portion of the or each rod may be formed from a non-reactive material suitable for use with biological samples, such as aluminium, titanium, titanium oxide, fibreglass, plastic, polypropylene, polycarbonate, metal, metal alloy, or a medical-grade material.

In embodiments, the device comprises: a piston for applying a force to the biological sample in the container; and an actuating element coupleable to the piston to move the piston within the container.

A volume in the container between the piston and the biological sample may be filled with a fluid. The piston may compress this fluid and thereby, cause the biological sample to be compressed, which induces a change in viscosity. The fluid may be any one of: a non-reactive gas, air, nitrogen, carbon dioxide, argon, a non-reactive liquid, a liquid with a lower density than the biological sample, or oil.

In embodiments, the device comprises: a rotating device for applying a rotational force to the biological sample in the container; and an actuating element coupleable to the rotating device to rotate within the biological sample in the container.

The rotating device may comprise a paddle or a propeller that is at least partly inserted into the biological sample and rotated within the biological sample to induce a change in viscosity.

The rotating device may comprise a cylinder that is at least partly inserted into the container in a concentric arrangement. The cylinder may rotates within the container. Additionally or alternatively, the actuating element may be coupleable to the container and cause the container to rotate relative to the cylinder.

At least a portion of the rotating device may be formed from at least one of: aluminium, titanium, titanium oxide, fibreglass, plastic, polypropylene, polycarbonate, metal, metal alloy, or a medical-grade material.

In embodiments, the device comprises: a compression device for compressing the biological sample in the container; and an actuating element coupleable to the compression device to operate the compression device.

The compression device may comprise: a guide rail; and a roller coupled to the guide rail. The container may be placed in the housing and the roller may be moved across a surface of the container to compress the biological sample.

The compression device may comprise: a first moveable plate; and a second plate provided in parallel to the first moveable plate; wherein the container is sandwiched in a space between the first moveable plate and the second plate. The actuating element may move the first moveable plate relative to the second plate to compress the container. The second plate may be a moveable plate, and the actuating element may move the second plate relative to the first moveable plate to compress the container.

In embodiments, the device is a sound generating device for generating sound waves that are directed through the container and biological sample to induce a change in viscosity. The sound generating device may, for example, generate ultrasound waves.

In embodiments, the device is a magnetic field generating device comprising a permanent magnet. In embodiments, the device is an electromagnetic field generating device (which may comprise an electromagnet).

The cryopreservation process may be a cooling process to cryopreserve the biological sample, and the apparatus may comprise a temperature control device to cool the biological sample.

The container may be removable from the apparatus when the cooling process is complete and stored in an external storage device. Alternatively, the container may remain within the apparatus when the cooling process is complete, such that the apparatus is used as long-term storage of cooled samples.

The temperature control device may cool the biological sample to any required temperature for cryopreservation, such as to −80° C., −100° C., −120° C., or −150° C. (These are merely exemplary temperature values).

The temperature control device may comprise at least one of: a Stirling engine cooler, and a coolant-based cooling system.

The cryopreservation process may be a heating process to warm/liquify the biological sample, and the apparatus may comprise a further temperature control device to heat the biological sample. The container may be removable from the apparatus when the heating process is complete.

The further temperature control device may heat the biological sample to a temperature equal to or above an equilibrium melting point of the biological sample. The further temperature control device may comprise at least one of: a resistive wire/resistive element, a passive warming system, and a fluid-based warming system.

The device for inducing a change in viscosity of the cryopreservation medium may induce shear thickening and/or shear thinning in the cryopreservation medium.

The apparatus may comprise a temperature sensor. The apparatus may comprise an ice detector. The ice detector may comprise a light emitter and light detector, and/or an electrical sensor for detecting changes in resistance or conductance in the biological sample.

According to a second aspect of the present invention, there is provided a method for preventing the formation of ice crystals during a cryopreservation process, the method comprising performing the cryopreservation process using an apparatus described herein to induce a change in viscosity of a non-Newtonian cryopreservation medium.

According to a third aspect of the present invention, there is provided a non-transitory data carrier carrying code which, when implemented on a processor, causes the processor to carry out any of the methods described herein.

Computer program code for carrying out operations of the present invention may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

BRIEF DESCRIPTION OF THE DRAWINGS

The techniques are diagrammatically illustrated, by way of example, in the accompanying drawings, in which.

DETAILED DESCRIPTION

Broadly speaking, embodiments of the present technique provide apparatus for preventing the formation of ice crystals in a biological sample containing a non-Newtonian fluid as a cryopreservation medium. The apparatus may be used to prevent ice formation during cryopreservation of biological samples, or during warming/liquification of cryopreserved biological samples. Advantageously, embodiments of the apparatus may be manufactured for compatibility with existing, widely used laboratory equipment, such as vials, cryovials, cryobags, microfuge tubes, centrifuge tubes, medical vials, and other containers suitable for storing biological samples. A further advantage of the apparatus is increased sample viability following cryopreservation and subsequent warming of cryopreserved samples. A further advantage of embodiments of the apparatus is that quality and process control may be performed during a cooling or warming process. For example, ice crystal formation may be detectable during cooling/warming using the apparatus, which may provide information at an early stage on sample viability after warming a cryopreserved sample.

The apparatus described herein prevents ice crystal formation in biological samples by changing the viscosity of the non-Newtonian fluid used as a cryopreservation medium. In embodiments, the change in viscosity may be increased by inducing shear thickening of the cryopreservation medium. In embodiments, the change in viscosity may be decreased by inducing shear thinning of the cryopreservation medium. In embodiments, both shear thickening and shear thinning may be induced during a cooling or warming process, e.g. in a sequential manner (i.e. one after the other). For example, the apparatus may induce shear thickening and then induce shear thinning of the cryopreservation medium during a cooling or warming process. In embodiments of the apparatus, the change in viscosity may be achieved by mechanical, sonic, magnetic or electromagnetic radiation means or a combination of a plurality of these means in a simultaneous or sequential manner. The apparatus is described in more detail below with respect to the Figures.

Figure 1:
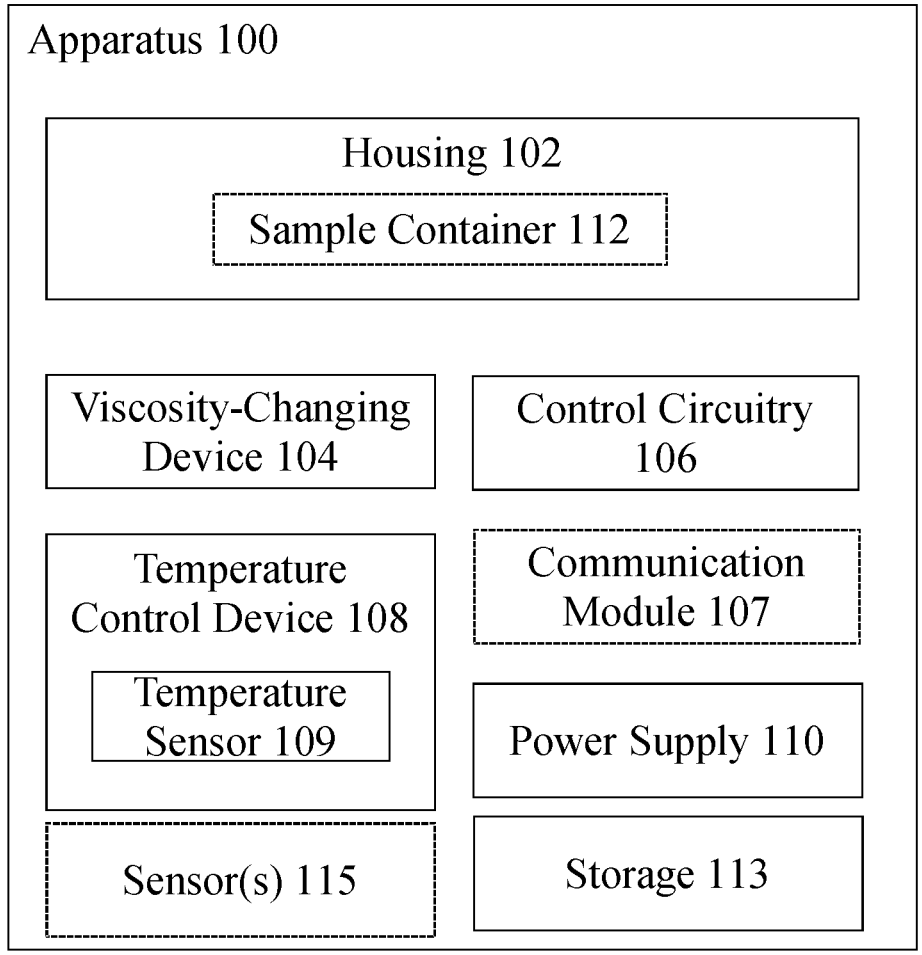
FIG. 1 shows a schematic block diagram of an apparatus for preventing the formation of ice crystals during a cryopreservation process.

FIG. 1 shows a schematic block diagram of an apparatus 100 for preventing the formation of ice crystals during a cryopreservation process. The term 'cryopreservation process' used herein means a cryopreservation technique to cool or vitrify a biological sample, and/or a process to warm a biological sample previously cryopreserved.

Apparatus 100 comprises a housing 102 suitable for (or designed specifically for) at least one sample container 112. Sample container 112 contains a biological sample and a non-Newtonian fluid as a cryopreservation medium. The sample container 112 may be any suitable container for containing biological samples. For example, sample container 112 may be a cryovial, cryobag, microfuge tube, medical vial, centrifuge tube, etc. It will be understood that this list of container types is merely provided for illustrative purposes and is non-limiting. The sample container 112 may have an opening (as in the case of, for example, a centrifuge tube) via which the biological sample within the sample container may be accessed while the sample container is in housing 102. This may enable a device of the apparatus 100 to be inserted into the sample container 112 for the purpose of inducing a change in viscosity. In embodiments, the sample container 112 may be sealed (as in the case of, for example, a cryobag). In this case, the biological sample within the sample container may not be accessible while the sample container is in housing 102.

Housing 102 may be used to house one or more sample containers 112 during a cooling or warming process, and after the process is complete, the or each sample container 112 is removed for storage elsewhere. For example, in the case of cooling, a sample container 112 which contains a cryopreserved biological sample, may be removed from housing 102 and stored in long term storage (e.g. a freezer or cold room). Similarly, a sample container 112 containing a cryopreserved biological sample may be placed into housing 102 to undergo warming to liquify the sample, and after the warming is complete, the sample container 112 may be removed from housing 102 and used immediately or placed in a suitable short-term storage (e.g. a fridge or cold room).

In embodiments, the housing 102 may be able to house more than one sample container 112 at once. This may allow mass-cooling and/or mass-warming of biological samples. This may be useful if multiple biological samples of the same type, and/or contained in the same sample container type, need to be cooled/warmed at the same time. In embodiments, the apparatus 100 may comprise multiple housings 102, each suitable for holding one or more sample containers 112. Additionally or alternatively, each housing 102 may comprise separate chambers suitable for holding one or more sample containers 112. The multiple housings/separate chambers may be useful if multiple biological samples need to be cooled/warmed, but different processes need to be applied to the samples. For example, some samples may need to be cooled to a first temperature, while other samples may need to be cooled to a second, different temperature. Having multiple housings or separate chambers within a housing may enable different cooling or warming profiles to be applied to sample containers 112. These embodiments may also enable apparatus 100 to be used to cool and/or warm multiple samples simultaneously, or for multiple different cooling/warming profiles to be applied to multiple samples simultaneously.

In embodiments, sample container 112 is separate to, and removable from, housing 102. In this case, sample container 112 is inserted into housing 102 when the biological sample contained in sample container 112 needs to be cryopreserved or warmed. In alternative embodiments, sample container 112 is integrated within housing 102.

Apparatus 102 comprises at least one device 104 for inducing a change in viscosity of the cryopreservation medium within sample container 112 to prevent ice formation. The or each device 104 (referred to in FIG. 1 as a viscosity-changing device 104) within apparatus 102 may be any suitable device for inducing a change in viscosity of a non-Newtonian fluid cryopreservation medium. The device 104 may be capable of causing shear thickening of a non-Newtonian fluid, or shear thinning of a non-Newtonian fluid, or both. The device 104 may comprise mechanical components capable of inducing a viscosity change in the cryopreservation medium, magnetic or electromagnetic components, sound-generating components, or a combination of such components. Some examples of how device 104 may cause a viscosity change in a cryopreservation medium are described below with respect to FIGS. 2 to 8.

Apparatus 100 comprises control circuitry 106. Control circuitry 106 may comprise a processor or processing circuitry to control various processing operations performed by apparatus 100, such as controlling the heating and/or cooling mechanism that alters the temperature of the biological sample in sample container 112, and/or controlling the device 104 which induces a change in viscosity of the biological sample. The control circuitry 106 may control other sensors and devices within apparatus 100, such as those used to monitor the cooling/warming process and/or to detect ice crystal formation. The control circuitry 106 may comprise one or more of: a microprocessor, a microcontroller, and an integrated circuit. In embodiments, a single control circuitry/processor 106 may be used to control all functions of the apparatus 100. In alternative embodiments, some or all functions/devices within the apparatus 100 may be coupled to their own dedicated control circuitry/processor.

The apparatus 100 may comprise a communication module 107 that enables the apparatus 100 to communicate with a user/operator of the device (e.g. via a visual, audio, or audio-visual interface of apparatus 100), and/or to communicate with a remote server, remote database, or other devices. Communication with remotely-located devices (e.g. servers, databases, devices, etc. which are external to apparatus 100) may enable data obtained during a cooling/warming process performed by apparatus 100 to be shared with users, or with other interested parties, in a simple way. For example, apparatus 100 may be able to share information on quality control or on ice crystal detection with a user during, or after, a cooling/warming process, such that a user may receive information about the process and/or on sample viability. The communication module may be any suitable communication module, comprising any suitable communication circuitry and using any suitable communication protocols, to transmit and receive messages (or data, or data packets). The communication module 107 may use any suitable communication protocol to communicate with other machines (e.g. remote servers, databases, machines running particular services/applications, etc.), such as, but not limited to, wireless communication (e.g. WiFi), short range communication such as radio frequency communication (RFID) or near-field communication (NFC), or by using the communication protocols specified by ZigBee, Thread, Bluetooth, Bluetooth LE, IPv6 over Low Power Wireless Standard (6LoWPAN), or Constrained Application Protocol (CoAP). The communication module 107 may use a wireless mobile (cellular) telecommunication protocol to communicate with remote machines, e.g. 3G, 4G, 5G, etc. In embodiments, the apparatus 100 may communicate with remote machines using wired communication techniques, such as via metal cables or fibre optic cables. The apparatus 100 may use more than one communication technique to communicate with remote machines.

Apparatus 100 may comprise storage 113. Storage 113 may comprise a volatile memory, such as random access memory (RAM), for use as temporary memory, and/or non-volatile memory such as Flash, read-only memory (ROM), or electrically erasable programmable ROM (EEPROM), for storing data, programs or instructions. Storage 113 may store data or instructions used to control a cooling or warming process. Different cooling and warming processes may be applied to different types of biological sample, or to samples contained in different types of sample container. Accordingly, storage 113 may store a plurality of different instructions, which may, in embodiments, be indexed by sample type or sample container, so that the correct temperature profile may be applied to a specific sample type or sample container type. Storage 113 may store data that is collected during a cooling or warming process, such as quality control data, ice crystal detection data, etc.

Apparatus 100 may comprise a temperature control device 108 for controlling the temperature applied to a sample container 112 during a cooling or warming process. The apparatus 100 may comprise one or more components suitable for cooling/cryopreserving a biological sample, and may comprise one or more components suitable for warming a cryopreserved biological sample. For example, the apparatus 100 may comprise one or both of the following for cooling a sample: a Stirling engine cooler, and a coolant-based cooling system. The apparatus 100 may comprise any one or more of the following for heating a sample: a resistive wire/resistive element, a passive warming system, and a fluid-based warming system. It will be understood that these examples of cooling and heating mechanisms are merely provided for illustrative purposes and are non-limiting. Alternatively, the same component(s) may be used for both cooling and heating. For example, a fluid-based system may be suitable for cooling and heating.

Temperature control device 108 may comprise, or be coupled to, a processor/control circuitry which controls the operation of the temperature control device 108. For example, the control circuitry may be used to turn on the temperature control device, control the temperature applied to a sample container 112, control how long a particular temperature is applied to a sample container 112, etc. In embodiments, where multiple samples can be cooled and/or warmed in apparatus 100 simultaneously, separate temperature control devices 108 may be coupled to each housing 102, or to each chamber within a housing 102. In this case, a dedicated processor/control circuitry may be provided for each temperature control device 108. Alternatively, a single processor/control circuitry may be used to control each temperature control device 108.

The or each temperature control device 108 may comprise a temperature sensor 109. The temperature sensor 109 may be used to sense temperature of a sample container 112, or to sense temperature in the vicinity of a sample container 112, or to sense temperature of a housing 102 in which a sample container 112 is provided. The temperature sensor 109 may be used to sense temperature before, during, and/or after a cooling or warming process is performed. The temperature sensor 109 may be used to control the temperature applied by the temperature control device 108. In embodiments, a cryopreservation process may require a biological sample to be cooled to (and possibly stored at), for example, −80° C., −100° C., −120° C., or −150° C., or anywhere in-between. (These are merely exemplary, non-limiting temperatures, and are provided for illustrative purposes only). In embodiments, a warming process may comprise warming a cryopreserved, vitrified biological sample to a temperature above the sample's equilibrium melting point. The temperature sensor 109 may be used to collect temperature data as part of quality control process and/or as part of process control.

Apparatus 100 may comprise a power supply 110 to power the components of the apparatus (e.g. the temperature control device 108, the viscosity-changing device 104, etc.) The power supply 110 may be a connection to mains power, or may be at least one battery, or a combination of both.

Apparatus 100 may comprise one or more additional sensors 115. For example, apparatus 100 may comprise a power sensor, a sensor to monitor rotational motion (e.g. revs/sec), and/or a sensor for detecting ice crystal formation. The sensor for detecting ice crystal formation may be, for example, a laser- or light-based sensor. A light/laser beam may be passed through a sample container 112 that is undergoing cooling/warming, and light detectors may be provided in the housing 102 to detect deflections of the light/laser beam. Particular deflections (e.g. particular angles of deflection) of the light/laser beam may indicate that ice crystals have been formed in the sample. The sensor for detecting ice crystal formation may be, for example, an electrical sensor. The electrical sensor may be, or comprise, an anode which detects changes in resistance or conductance in the sample being cryopreserved/warmed, which may be indicative of ice crystal formation. In embodiments, a window may be provided in apparatus 100 (and potentially in housing 102) so that a visual inspection of a sample container 112 in housing 102 may be performed during a cooling/warming process, so that ice crystals may be detected by an operator of apparatus 100. The data collected by sensor(s) 115 may be provided to processor/control circuitry 106. The processor 106 may use the data to determine whether or not ice has formed in a sample. If the sensed data indicates ice has been formed, the processor 106 may provide this information to the communication module 107. The communication module 107 may transmit this information to a user (e.g. via a user interface of the apparatus 100) or to a remote machine. The sensed data, and any determination made by processor 106, may be stored in storage 113 for future use/analysis.

The viscosity-changing device 104 may operate in tandem with the temperature control device 108 to induce changes in viscosity at particular temperatures. For example, the viscosity-changing device 104 may be used to induce a viscosity change at a temperature which accelerates perfusion and/or diffusion of a cryoprotective agent (CPA) into a biological sample. In another example, the viscosity-changing device 104 may be used to induce a viscosity change either before cooling commences or at the same time as cooling is applied to a sample to be cryopreserved. In another example, the viscosity-changing device 104 may be used to induce a viscosity change in a cooled sample (which may or may not have been cooled via cryopreservation), at (or below) a glass transition temperature of the sample. The viscosity-changing device 104 may be used (continuously or intermittently) until the sample temperature rises above the sample's freezing point.

The apparatus of the present invention exploits the non-Newtonian fluid properties of the cryopreservation medium to modulate, i.e. increase (via shear thickening) or decrease (via shear thinning), the viscosity of the cryopreservation medium as appropriate for the phase of the cryopreservation process. Decreasing the viscosity of the cryopreservation medium can be advantageous as a cryoprotective agent (CPA) colloid solution may initially take many minutes to perfuse and/or diffuse into organic tissue. Inducing a decrease in viscosity (i.e. the viscosity of the cryoprotective agent colloid solution or cryopreservation medium) may reduce perfusion time. As CPA toxicity is time-dependant, total toxicity during the perfusion state is reduced as a function of the reduced perfusion time.

Increasing the viscosity of the cryopreservation medium may advantageously be used to prevent the formation of ice crystals in the sample while cooling to a temperature below the freezing point of water, thus substantially or completely eliminating the growth of ice crystals. This viscosity modulating effect is equally important during the warming cycle as heating with an increased viscosity prevent or at least substantially reduces the chance of ice crystallisation at this stage of the cryopreservation process.

Modification of the viscosity of the cryopreservation medium can be effected by applying an external stress to induce non-Newtonian properties. Induction of non-Newtonian properties can be achieved by shear thickening or shear thinning, by sound thickening or sound thinning, or by electromagnetic field thickening or thinning, for example magnetic thinning or thickening. Some preferred non-Newtonian fluids undergo a reduction in viscosity when exposed to low frequency stress and undergo an increase in viscosity in response to a high frequency stress.

Shear forces can be exerted for example by shaking (vibration), stirring (agitating), pressure waves or other mechanical means. For example, shear forces can be applied to a biological sample in a cryopreservation medium in a cylindrical container by immersing a rod into the cryopreservation medium and then rotating the rod. Another example of a configuration in which a shear force could be applied to a sample would involve placing a biological sample in a cryopreservation medium between two parallel plates with either one or both of these plates moving parallel relative to the other. Shear thickening is the non-Newtonian behaviour wherein the viscosity of a fluid increases on the application of stress to a fluid. Shear thinning is the non-Newtonian behaviour of fluids whose viscosity decreases under shear stress. The fluid that undergoes shear thinning or shear thickening can be a solution or a suspension, for example a colloidal suspension. For example, the shear thickening fluid cryopreservation medium may be a suspension containing fine particles such as silica, a colloidal solution/suspension or a solution per se. This mechanism (i.e. the methods of the invention of cryopreservation that exploit the non-Newtonian fluid properties of a cryopreservation medium to deliver substantially ice free cryopreservation methods) is not isolated to only systems where CPAs are spiked with hard shell colloids such as silicone, HES, starches, cells, cellular components, glass etc. Spiking with materials that enable electromagnetic field induced viscosity changes, sound and/or light induced viscosity changes, are also possible. This list is not exhaustive.

A number of possible viscosity-changing devices 104 are now described in more detail.

Figure 2:
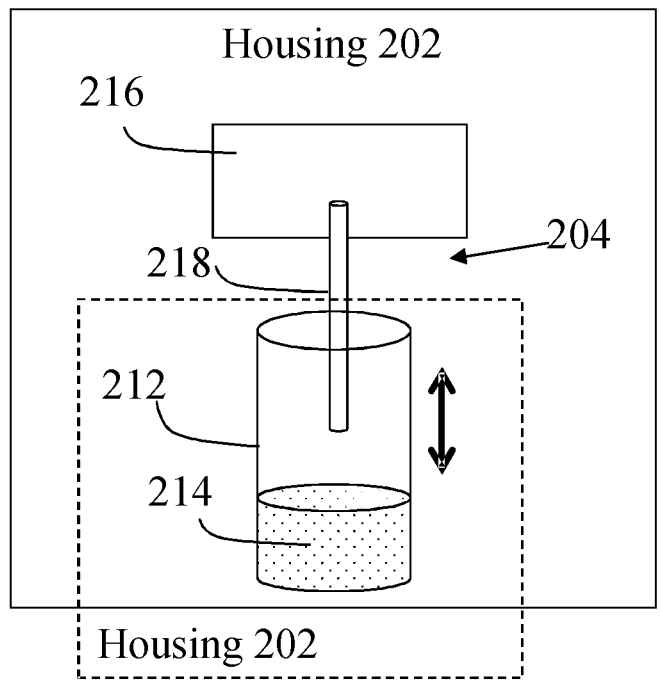
FIG. 2 shows a schematic diagram of an apparatus comprising a tapping device to prevent ice crystal formation.

FIG. 2 shows a schematic diagram of an apparatus 200 comprising viscosity-changing device 204 for preventing the formation of ice crystals during a cryopreservation process. Apparatus 200 is substantially identical to apparatus 100 of FIG. 1 except that apparatus 200 comprises a specific viscosity-changing device 204. Accordingly, like reference numerals refer to the same or similar elements. For example, the apparatus 200 comprises a temperature control device 208, temperature sensor 209, control circuitry 206, power supply 210 and storage 213, which are the same or similar to elements 108, 109, 106, 110 and 113 described above. Thus, for the sake of brevity, such elements are not described again.

In apparatus 200, the viscosity-changing device 204 is a tapping device. In embodiments, the viscosity-changing device 204 is provided within, or integral to, housing 202 (as shown by the box around housing 202 and device 204). In alternative embodiments, the housing 202 may be separate to, but in the vicinity of, device 204 (as shown by the dashed box in FIG. 2).

The viscosity-changing device 204 comprises a rod 218 and an actuating element/actuating device 216. The rod 218 may be fixedly coupled to the actuating element 216, or may be releasably coupleable to (or detachable from) the actuating element 216. The actuating element 216 is arranged to repeatedly raise and lower the rod 218 into proximity with a surface of a biological sample 214 in sample container 212. The actuating element 216 may be coupled to control circuitry 206, or may have dedicated control circuitry, that controls the operation of actuating element 216 and therefore, rod 218. In the embodiment of FIG. 2, the sample container 212 may be any container suitable for containing a biological sample. For example, sample container 212 may be a cryovial, cryobag, microfuge tube, medical vial, centrifuge tube, etc. Sample container 212 contains a biological sample and a non-Newtonian fluid as a cryopreservation medium. The sample container 212 may have an opening (as in the case of, for example, a centrifuge tube) via which the biological sample within the sample container may be accessed while the sample container is in housing 202. This may enable the rod 218 of the viscosity-changing device 204 to be inserted into the sample container 212 for the purpose of inducing a change in viscosity. In embodiments, the sample container 212 may be sealed (as in the case of, for example, a cryobag). In this case, the rod 218 may be brought into contact with a surface of the sample container.

The rod 218 is used to tap repeatedly on a surface of the sample container 212, on a surface of biological sample 214 in sample container 212, or on an intermediate element located between biological sample 214 and rod 218. The tapping action induces shear thinning or shear thickening of the non-Newtonian fluid within biological sample 214. A fluid is shear thickening if the viscosity of the fluid increases as shear rate increases. A fluid is shear thinning if the viscosity of the fluid decreases as shear rate increases. In the case where the sample container 212 is sealed (e.g. a cryobag or a closed tube), the rod 218 may repeatedly tap on a surface of the sample container 212 to induce a change in the viscosity of the biological sample 214. In the case where the sample container 212 has an opening, the rod 218 may be inserted into the sample container 212 (as shown in FIG. 2) and may repeatedly tap on a surface of the biological sample 214, or may be repeatedly inserted into the biological sample 214. The rod 218 may be lowered just under a surface of the biological sample 214, or may be lowered into the biological sample 214 by an amount sufficient to induce the required change in viscosity. If device 204 is being used to prevent ice crystal formation during a warming/liquifying process, the rod 218 may not be insertable into the biological sample 214 until the biological sample has at least partly liquified. In embodiments, an intermediate element (not shown in FIG. 2) may be placed between rod 218 and biological sample 214. For example, a thin membrane may be placed above/on top of biological sample 214 to prevent direct contact between rod 218 and biological sample 214. This may be useful if, for example, there is a risk of contamination/cross-contamination. This may have use if there is a risk of the rod becoming trapped within the cryopreservation medium. In this case, rod 218 taps on the intermediate element (e.g. membrane) and the force caused by the tapping is transferred to the biological sample 214 via the intermediate element.

The actuating element 216 is used to control the movement of rod 218, including the rate of tapping. The rod 218 may impact the surface/tap on the surface of biological sample 214 from any direction. In embodiments, the device 204 may comprise multiple rods 218, which may work in unison or may be separately controllable. The plurality of rods 218 may all impact the biological sample 214 or sample container 212 from the same direction, or from different directions, or at different angles. The rods 218 may impact the sample 214/sample container 212 at different rates and/or at different times. That is, the rods 218 may be in-phase with each other or out-of-phase. The actuating element 216 may cause the or each rod 218 to tap at a rate suitable for inducing a change in viscosity within the biological sample 214. For example, the or each rod 218 may be caused to tap at a rate from (and including) 100 times per second up to (and including) 0.1 times per second. In particular embodiments, the or each rod 218 may tap at a rate of 3 times per second. The actuating element 216 may cause the or each rod 218 to tap with a particular force (i.e. to impart a particular force) suitable for inducing a change in viscosity within the biological sample 214. For example, the or each rod 218 may be caused to impart a force of from (and including) 0.5N up to (and including) 20N. In particular embodiments, the or each rod 218 may impart a force of between 10N to 13N. In particular embodiments, the rod may impart a force relative to the volume of the sample. For example, rod 208 may impart a force of between 1N and 2N per millilitre. In embodiments, the tapping rate and force required to induce a change in viscosity suitable to prevent ice crystal formation may vary with temperature. As mentioned above, each rod 218 may be controlled by actuating element 216 to tap at different rates/forces, and each rod 218 may tap at different rates/forces for different samples, different processes (warming or cooling) or different points within a warming/cooling process.

The or each rod 218 may be any shape and size to impart the required force to induce viscosity change. In particular embodiments, the rod 218 may be cylindrical. The or each rod 218 may be formed of any material. As rod 218 may come into direct contact with, or be inserted into, biological sample 214, the rod 218 may be formed of a strong, non-reactive material that will not alter the biological sample 214. For example, rod 218 may be formed from aluminium, a medically-approved material, materials that are medically-approved for use in artificial joints/artificial limbs (e.g. titanium), fibreglass, plastics (e.g. polypropylene or polycarbonate), metal or metal alloys. It will be understood that this is a non-exhaustive list of possible materials. In embodiments, the entire length of rod 218 may be formed of a non-reactive material. In alternative embodiments, at least a section of rod 218 that will be in contact with a biological material may be formed of a non-reactive material.

In embodiments, rod 218 may be a piston. In this case, the rod 218 may fit closely within sample container 212. Actuation of the piston may cause a fluid layer above sample 214 in sample container 212 to be repeatedly compressed and decompressed, such that the pressure above the sample 214 changes. This change in pressure may provide the required force to induce a change in viscosity of the sample 214. It will be understood that the rod 218 may take any form to function as a piston within sample container 212. For example, the rod 218 may be a thin rod attached to a disc which may move against the fluid layer in the sample container 212. The gap between the piston and the biological sample 214 in sample container 212 may be filled with a gas to provide a gas layer. For example, the gap could be filled with air, nitrogen, carbon dioxide, argon, or any other gas that is non-reactive with the sample 214. The gap between the piston and the biological sample 214 in sample container 212 may be filled with a liquid to provide a fluid layer. For example, the gap could be filled with a liquid which is less dense than the biological sample 214 such that it lies above the biological sample in the sample container 212. The liquid is preferably non-reactive with the sample 214. The liquid may be an oil, for example. In embodiments, the gap could be filled with a combination of a gas and a liquid.

In embodiments where the tapping device 204 is inserted into the biological sample 214, the rod 218 of tapping device 204 may remain within the biological sample 214 as it solidifies. The rod 218 may therefore, remain within the biological sample 214. In this case, it may be advantageous for the rod 218 to be releasably coupled to the actuating element 216, such that the rod 218 may be detached from the actuating element 216 and the sample container 212 removed from housing 202. The sample container 212 may be stored in a long-term storage device (e.g. a freezer) with the rod 218 in-situ. When the sample contained within sample container 212 is to be warmed/liquified, the sample container 212 may be reinserted into housing 202 and the rod 218 may be reattached to actuating element 216. This may enable the tapping device to be used during the warming process.

Figure 3:
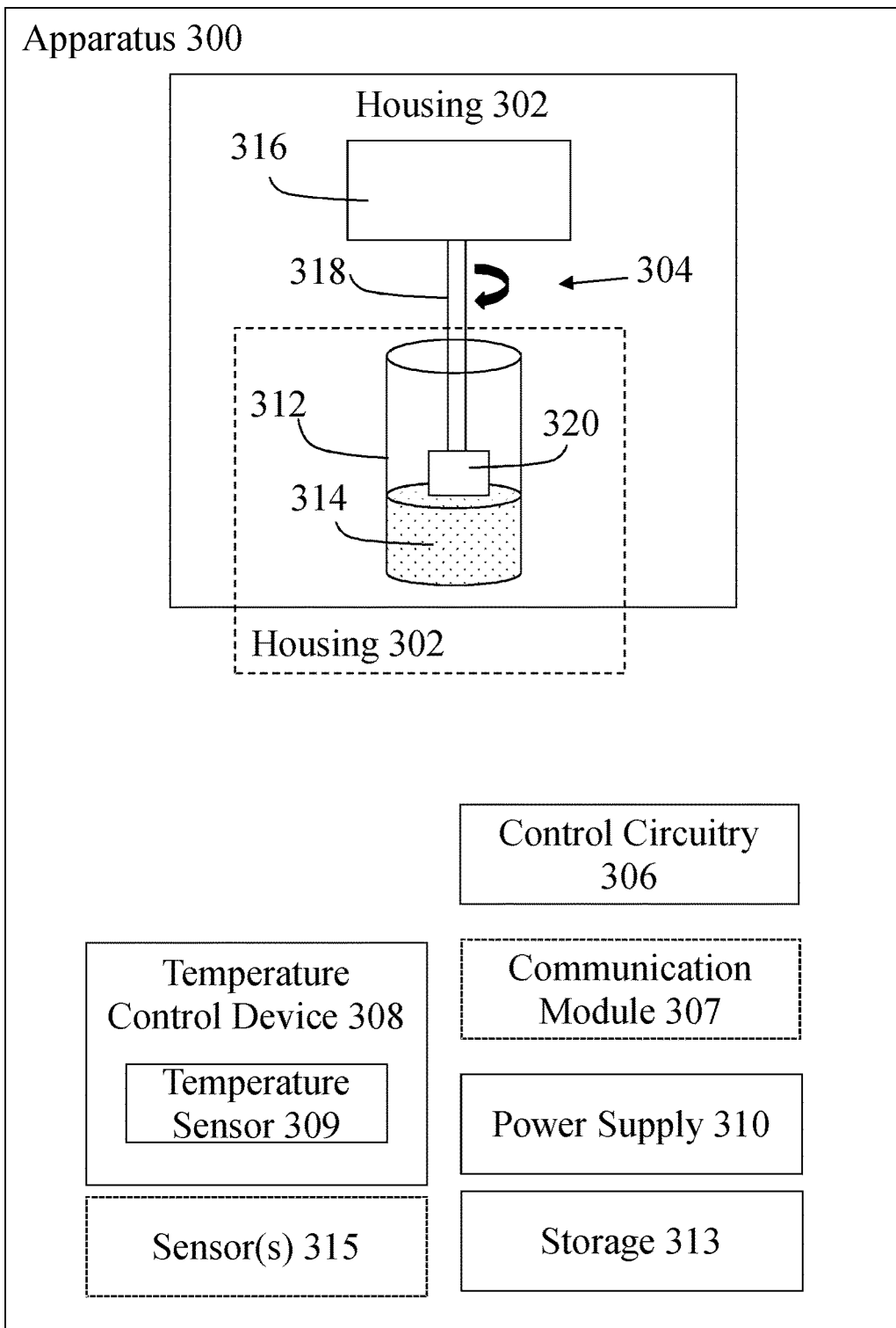
FIG. 3 shows a schematic diagram of an apparatus comprising a paddle device to prevent ice crystal formation.

FIG. 3 shows a schematic diagram of an apparatus 300 comprising viscosity-changing device 304 for preventing the formation of ice crystals during a cryopreservation process. Apparatus 300 is substantially identical to apparatus 100 of FIG. 1 except that apparatus 300 comprises a specific viscosity-changing device 304. Accordingly, like reference numerals refer to the same or similar elements. For example, the apparatus 300 comprises a temperature control device 308, temperature sensor 309, control circuitry 306, power supply 310 and storage 313, which are the same or similar to elements 108, 109, 106, 110 and 113 described above. Thus, for the sake of brevity, such elements are not described again.

In apparatus 300, the viscosity-changing device 304 is a rotating device. In embodiments, the viscosity-changing device 304 is provided within, or integral to, housing 302 (as shown by the box around housing 302 and device 304). In alternative embodiments, the housing 302 may be separate to, but in the vicinity of, device 304 (as shown by the dashed box in FIG. 3).

The viscosity-changing device 304 comprises a rod 318, a paddle 320 and an actuating element/actuating device 316. Paddle 320 is provided at one end of rod 318. The paddle 320 is insertable into biological sample 314 as shown in FIG. 3. The opposite end of rod 318 may be fixedly coupled to the actuating element 316, or may be releasably coupleable to (or detachable from) the actuating element 316. The actuating element 316 is arranged to rotate rod 318, and thereby rotate paddle 320 within biological sample 314. The actuating element 316 may be coupled to control circuitry 306, or may have dedicated is control circuitry, that controls the operation of actuating element 316 and therefore, rod 318 and paddle 320. In the embodiment of FIG. 3, the sample container 312 may be any container suitable for containing a biological sample, wherein the container has an opening for insertion of the paddle 320. For example, sample container 312 may be a microfuge tube, medical vial, centrifuge tube, etc. Sample container 312 contains a biological sample and a non-Newtonian fluid as a cryopreservation medium. The sample container 312 has an opening via which the biological sample within the sample container may be accessed while the sample container is in housing 302. This may enable the rod 318 and paddle 320 of the viscosity-changing device 304 to be inserted into the sample container 312 for the purpose of inducing a change in viscosity.

The paddle (or propeller) 320 is used to stir the biological sample 314 in sample container 312. The rotating action induces shear thinning or shear thickening of the non-Newtonian fluid within biological sample 314. A fluid is shear thickening if the viscosity of the fluid increases as shear rate increases. A fluid is shear thinning if the viscosity of the fluid decreases as shear rate increases. The paddle 320 may be inserted partly into, or completely into, the biological sample 314, or may be inserted into the biological sample 314 by an amount sufficient to induce the required change in viscosity when the paddle 320 is rotated. If device 304 is being used to prevent ice crystal formation during a warming process, the paddle 320 may not be insertable into the biological sample 314 until the biological sample has at least partly warmed/liquified. Thus, an alternative viscosity-changing device may be used to prevent ice crystal formation when beginning a warming process, which does not need to be inserted into the biological sample 314.

The actuating element 316 is used to control the rotation of rod 318 and paddle 320, including the speed of rotation. The rod 318 and paddle 320 may rotate in a clockwise or anticlockwise direction, or may be able to switch directions. In embodiments, the device 304 may comprise multiple small rods 318 and paddles 320, which may rotate in unison or may be separately rotatable. The plurality of paddles 320 may rotate at different speeds and/or in different directions. The actuating element 316 may cause the or each paddle 320 to rotate at a speed suitable for inducing a change in viscosity within the biological sample 314. For example, the or each paddle 320 may be caused to rotate at a speed from (and including) 100 revolutions per second up to (and including) 0.1 revolutions per second. In particular embodiments, the or each paddle 320 may rotate at a speed of 3 revolutions per second. In embodiments, the rotation speed required to induce a change in viscosity suitable to prevent ice crystal formation may vary with temperature. As mentioned above, each paddle 320 may be controlled by actuating element 316 to rotate at different speeds, and each paddle 320 may rotate at different speeds for different samples, different processes (warming or cooling) or different points within a warming/cooling process.

The or each paddle 320 may be any shape and size to impart the required force to induce viscosity change. The or each paddle 320 may be formed of any material. As paddle 320 (and potentially rod 318) is inserted into biological sample 314, the paddle 320 (and all or parts of rod 318) may be formed of a strong, non-reactive material that will not alter the biological sample 314. For example, paddle 320 may be formed from aluminium, a medically-approved material, materials that are medically-approved for use in artificial joints/artificial limbs (e.g. titanium), fibreglass, plastics (e.g. polypropylene or polycarbonate), metal or metal alloys. It will be understood that this is a non-exhaustive list of possible materials. In embodiments, the entirety of paddle 320 may be formed of a non-reactive material. In alternative embodiments, at least a section of paddle 320 that is inserted into a biological sample may be formed of a non-reactive material.

In embodiments, the paddle 320 of tapping device 304 may remain within the biological sample 314 as it solidifies. The paddle 320 may therefore, remain within the biological sample 314. In this case, it may be advantageous for the rod 318 to be releasably coupled to the actuating element 316, such that the rod 318, and therefore paddle 320, may be detached from the actuating element 316 and the sample container 312 removed from housing 302. In embodiments, paddle 320 may be releasably coupled to rod 318, such that paddle 320 may be detached from rod 318 when the paddle 320 is trapped within a solidified, cooled sample 314. This may enable the sample container 312 to be removed from housing 302. The sample container 312 may be stored in a long-term storage device (e.g. a freezer) with the paddle 320 (or paddle 320 and rod 318) in-situ. When the sample contained within sample container 312 is to be warmed, the sample container 312 may be reinserted into housing 302 and the paddle 320 may be reattached to the rod 318 (or the rod 318 may be reattached to actuating element 316). This may enable the rotating paddle device to be used during the warming process.

The speed of rotation of paddle 320 and power input during rotation may be monitored/recorded to determine whether ice crystals formed during cooling or warming. For example, if the force or power required to rotate paddle 320 increases unexpectedly during cooling or warming, it may be determined that ice crystals have formed in the biological sample 314. This may be because the paddle 320 may 'slip' more as ice crystals are formed, such that more power is used to rotate paddle 320 at the same speed compared to when no ice crystals are present.

Figure 4:
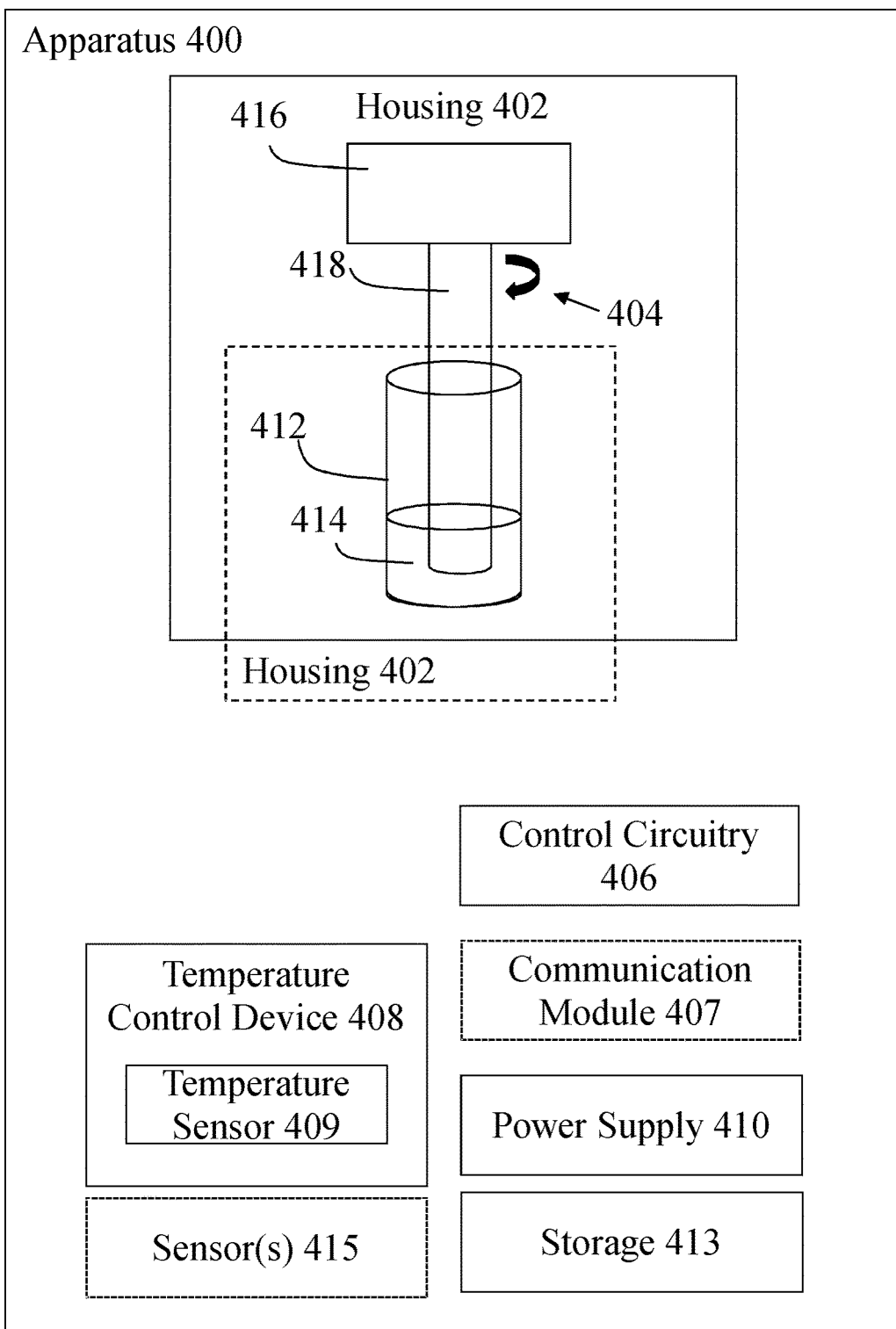
FIG. 4 shows a schematic diagram of an apparatus comprising a rotating device to prevent ice crystal formation.

FIG. 4 shows a schematic diagram of an apparatus 400 comprising viscosity-changing device 404 for preventing the formation of ice crystals during a cryopreservation process. Apparatus 400 is substantially identical to apparatus 100 of FIG. 1 except that apparatus 400 comprises a specific viscosity-changing device 404. Accordingly, like reference numerals refer to the same or similar elements. For example, the apparatus 400 comprises a temperature control device 408, temperature sensor 409, control circuitry 406, power supply 410 and storage 413, which are the same or similar to elements 108, 109, 106, 110 and 113 described above. Thus, for the sake of brevity, such elements are not described again.

In apparatus 400, the viscosity-changing device 404 is a rotating device. In embodiments, the viscosity-changing device 404 is provided within, or integral to, housing 402 (as shown by the box around housing 402 and device 404). In alternative embodiments, the housing 402 may be separate to, but in the vicinity of, device 404 (as shown by the dashed box in FIG. 4).

The viscosity-changing device 404 comprises a cylinder 418 and an actuating element/actuating device 416. Cylinder 418 is fixedly or releasably coupled at one end to actuating element 416. The opposite end of cylinder 418 is insertable into biological sample 414 as shown in FIG. 4. The actuating element 416 is arranged to spin/rotate cylinder 418 within biological sample 414. The actuating element 416 may be coupled to control circuitry 406, or may have dedicated control circuitry, that controls the operation of actuating element 416 and therefore, cylinder 418. In the embodiment of FIG. 4, the sample container 412 may be any container suitable for containing a biological sample, wherein the container has an opening for insertion of the cylinder 418. For example, sample container 412 may be a microfuge tube, medical vial, centrifuge tube, etc. Sample container 412 contains a biological sample and a non-Newtonian fluid as a cryopreservation medium. The sample container 412 has an opening via which the biological sample within the sample container may be accessed while the sample container is in housing 402. This may enable the cylinder 418 of the viscosity-changing device 404 to be inserted into the sample container 412 for the purpose of inducing a change in viscosity.

The cylinder 418 may be rotated within the biological sample 414 in sample container 412. As shown in FIG. 4, the cylinder 418 and sample container 412 are in a concentric arrangement. The biological sample 418 is located in the volume between the cylinder 418 and the inner surface of sample container 412. The rotating action induces shear thinning or shear thickening of the non-Newtonian fluid within biological sample 414. A fluid is shear thickening if the viscosity of the fluid increases as shear rate increases. A fluid is shear thinning if the viscosity of the fluid decreases as shear rate increases. The cylinder 418 may be inserted partly into, or completely into, the biological sample 414, or may be inserted into the biological sample 414 by an amount sufficient to induce the required change in viscosity when the cylinder 418 is rotated.

In embodiments, sample container 412 may be coupleable to actuating element 416 such that sample container 412 may itself be rotated. Thus, cylinder 418 may be rotated while sample container 412 is kept static, or sample container 412 may be rotated while cylinder 418 is kept static, or sample container 412 and cylinder 418 may both be rotated to induce shear thinning or shear thickening. In the latter case, sample container 412 may be rotated at the same or a different speed, and/or in the same or an opposite direction, to the rotation of cylinder 418.

If device 304 is being used to prevent ice crystal formation during a warming process, the paddle 320 may not be insertable into the biological sample 314 until the biological sample has at least partly warmed/liquified. Thus, an alternative viscosity-changing device may be used to prevent ice crystal formation when beginning a warming process, which does not need to be inserted into the biological sample 314.

The actuating element 416 is used to control the rotation of cylinder 418 and/or sample container 412, including the speed of rotation. The cylinder 418 and sample container 412 may rotate in a clockwise or anticlockwise direction, or may be able to switch directions. The actuating element 416 may cause the sample container 412 and/or cylinder 418 to rotate at a speed suitable for inducing a change in viscosity within the biological sample 414. For example, sample container 412 and/or cylinder 418 may be caused to rotate at a speed from (and including) 100 revolutions per second up to (and including) 0.1 revolutions per second. In embodiments, the rotation speed required to induce a change in viscosity suitable to prevent ice crystal formation may vary with temperature. As mentioned above, sample container 412 and/or cylinder 418 may be controlled by actuating element 416 to rotate at different speeds for different samples, different processes (warming or cooling) or different points within a warming/cooling process.

The inner surface of sample container 412 (which is in contact with biological sample 414) and/or cylinder 418 may be formed of any material, preferably a non-reactive material that will not alter or react with the biological sample 414. For example, at least the inner surface of sample container 412 and the cylinder 418 may be formed from aluminium, a medically-approved material, materials that are medically-approved for use in artificial joints/artificial limbs (e.g. titanium, titanium oxide), fibreglass, plastics (e.g. polypropylene or polycarbonate), metal or metal alloys. It will be understood that this is a non-exhaustive list of possible materials. In embodiments, the inner surface of sample container 412 and the surfaces of cylinder 418 which contact the sample 414 may be roughened to reduce slip.

In embodiments, the cylinder 418 of rotating device 404 may remain within the biological sample 414 as it cools. The cylinder 418 may therefore, remain within the solidified biological sample 414. In this case, it may be advantageous for the cylinder 418 to be releasably coupled to the actuating element 416, such that the cylinder 418 may be detached from the actuating element 416 and the sample container 412 removed from housing 402. The sample container 412 may be stored in a long-term storage device (e.g. a freezer) with the cylinder 418 in-situ. When the sample contained within sample container 412 is to be warmed/liquified, the sample container 412 may be reinserted into housing 402 and the cylinder 418 may be reattached to the actuating element 316. This may enable the rotating device to be used during the warming process.

The speed of rotation of cylinder 418 and power input during rotation may be monitored/recorded to determine whether ice crystals formed during cooling or warming. For example, if the force or power required to rotate cylinder 418 increases unexpectedly during cooling or warming, it may be determined that ice crystals have formed in the biological sample 414. This may be because the cylinder 418 and/or sample container 412 may 'slip' more as ice crystals are formed, such that more power is used to rotate the cylinder 418 and/or sample container 412 at the same speed compared to when no ice crystals are present.

Figure 5:
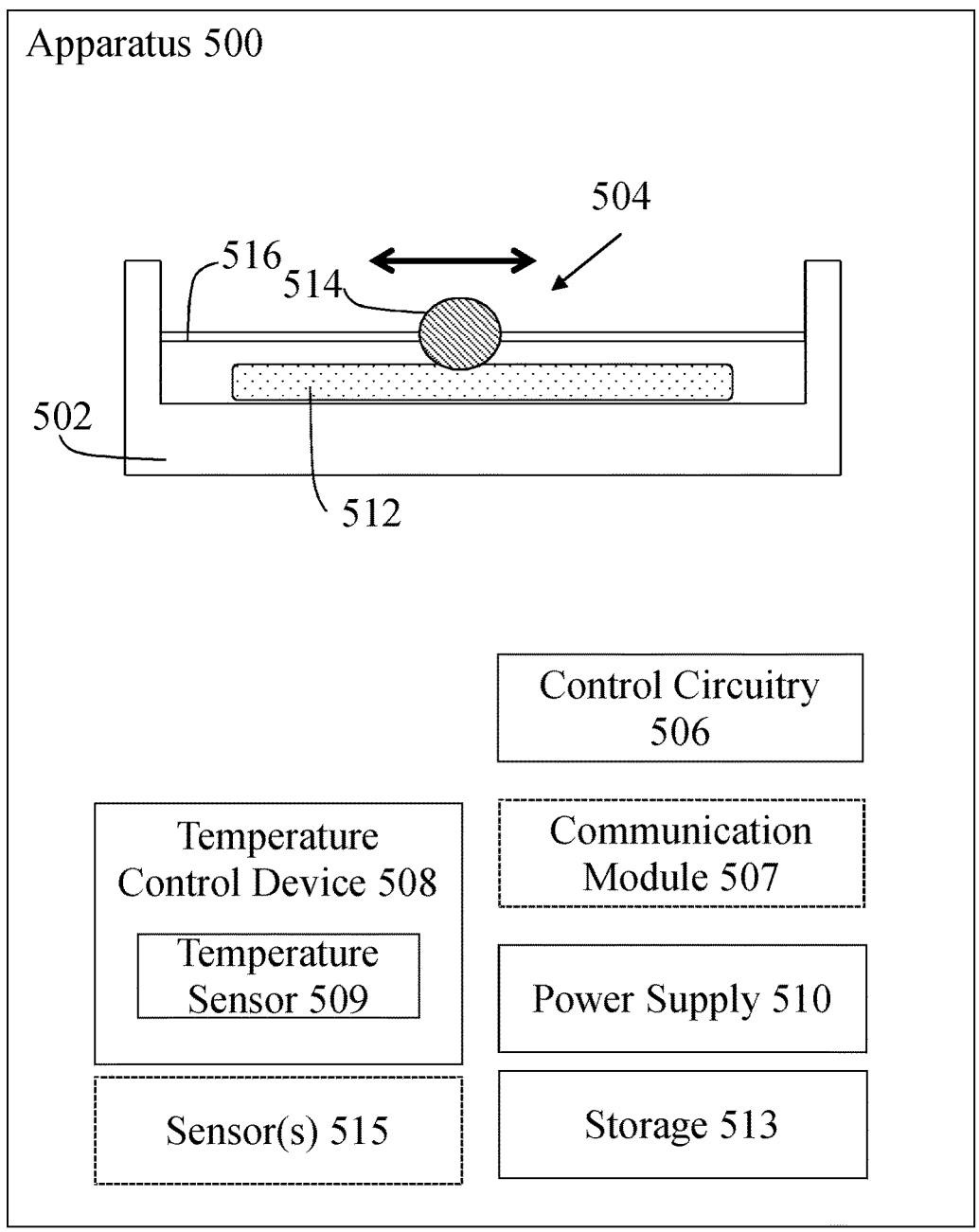
FIG. 5 shows a schematic diagram of an apparatus comprising a rolling device to prevent ice crystal formation.

FIG. 5 shows a schematic diagram of an apparatus 500 comprising viscosity-changing device 504 for preventing the formation of ice crystals during a cryopreservation process. Apparatus 500 is substantially identical to apparatus 100 of FIG. 1 except that apparatus 500 comprises a specific viscosity-changing device 504. Accordingly, like reference numerals refer to the same or similar elements. For example, the apparatus 500 comprises a temperature control device 508, temperature sensor 509, control circuitry 506, power supply 510 and storage 513, which are the same or similar to elements 108, 109, 106, 110 and 113 described above. Thus, for the sake of brevity, such elements are not described again.

In apparatus 500, the viscosity-changing device 504 is a rolling device. In embodiments, the viscosity-changing device 504 is provided within, or is integral to, housing 502. The viscosity-changing device 504 comprises at least one guide rail or guide rod 516 and a roller 514. The guide rail 516 may be fixedly coupled at each end to housing 502, or may be releasably coupleable to (or detachable from) the housing 502. Roller 514 is coupled to guide rail 516 such that roller 514 is able to rotate and move across the surface of a sample container 512. As shown in FIG. 5, a sample container 512 may be placed in housing 502 in such a way that roller 514 makes contact with a surface of the sample container 512. The roller 516 is able to roll across the surface of sample container 512, and in doing so, the roller 516 compresses the sample container 512. The roller 514 may be coupled to an actuating element (not shown) which controls the motion (i.e. speed and direction of movement) of roller 514. The actuating element may be coupled to control circuitry 506, or may have dedicated control circuitry, that controls the operation of actuating element and therefore, roller 514.

In the embodiment of FIG. 5, the sample container 512 may be any container suitable for containing a biological sample and which a roller 514 can roll over. Thus, the sample container 512 may be a malleable container, such as a cryobag or blood bag. Sample container 512 contains a biological sample and a non-Newtonian fluid as a cryopreservation medium. The roller 514 rolls repeatedly across all or part of a surface of the sample container 512. The rolling action causes compression of the biological sample, which induces shear thinning or shear thickening of the non-Newtonian fluid within the biological sample. A fluid is shear thickening if the viscosity of the fluid increases as shear rate increases. A fluid is shear thinning if the viscosity of the fluid decreases as shear rate increases.

The actuating element (not shown) is used to control the movement of roller 514, including the rate of rotation or speed at which the roller moves from one end of the rod 516 to the other. The actuating element may cause the roller 514 to roll across the sample container 512 at a rotation rate or speed suitable for inducing a change in viscosity within the biological sample. For example, the roller 514 may move back and forth across the sample container 512 at a speed of one cycle per second. The height/position of roller 514 and rod 516 within housing 502 may be adjustable (manually or automatically) so that any size of sample container 512 may be used within housing 50, and/or so that the compression force applied by roller 514 may be adjusted. This may enable the force applied by roller 514 to be adjusted from (and including) 0.5N up to (and including) 20N, for example. In particular embodiments, the roller 514 may impart a force of between 10N to 13N. In particular embodiments, the roller 514 may impart a force relative to the volume of the sample/size of the sample container 512. For example, roller 514 may impart a force of between 1N and 2N per millilitre. In embodiments, the speed of movement and/or force required to induce a change in viscosity suitable to prevent ice crystal formation may vary with temperature. Thus, roller 514 may be controlled by an actuating element to move at different rates (or to apply different forces) for different samples, different processes (warming or cooling) or different points within a warming/cooling process.

Figure 6:
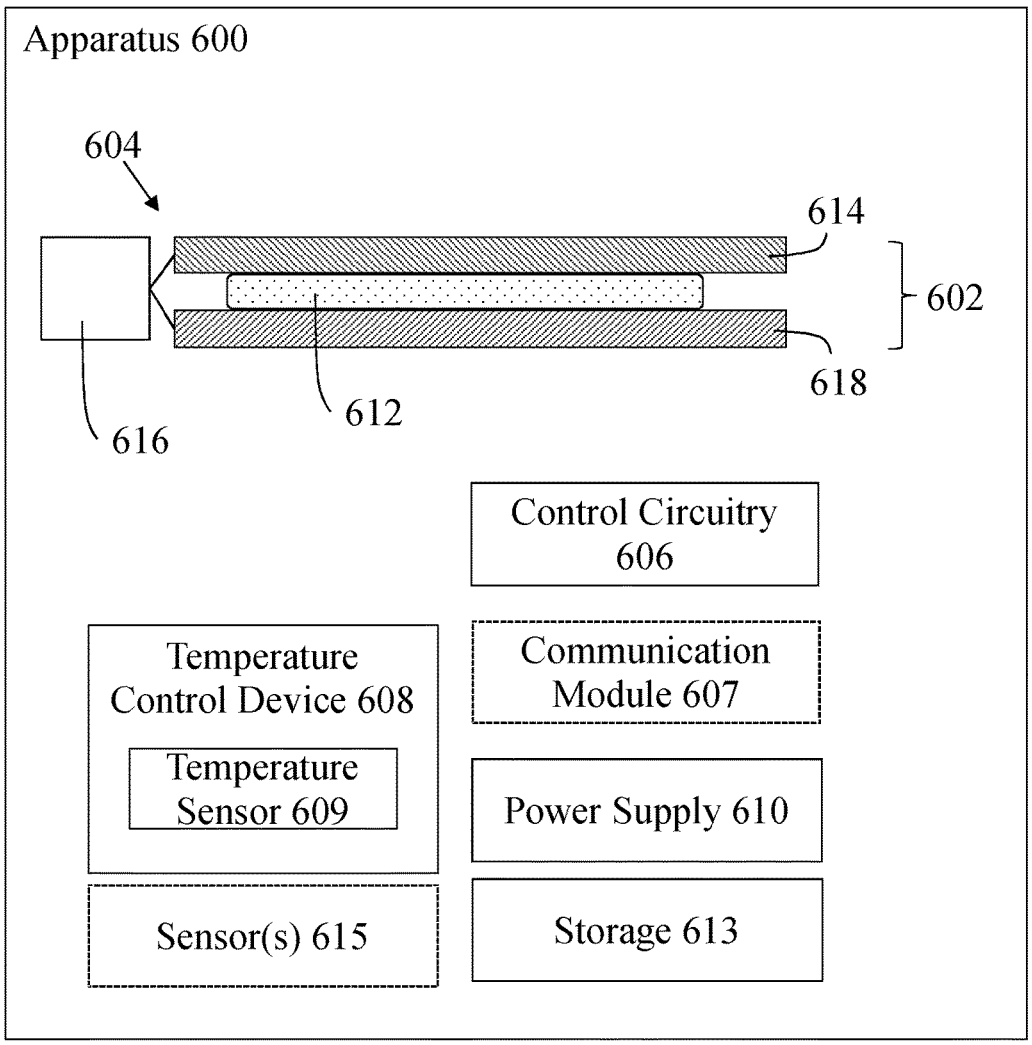
FIG. 6 shows a schematic diagram of an apparatus comprising a compressing device to prevent ice crystal formation.
Figure 6:
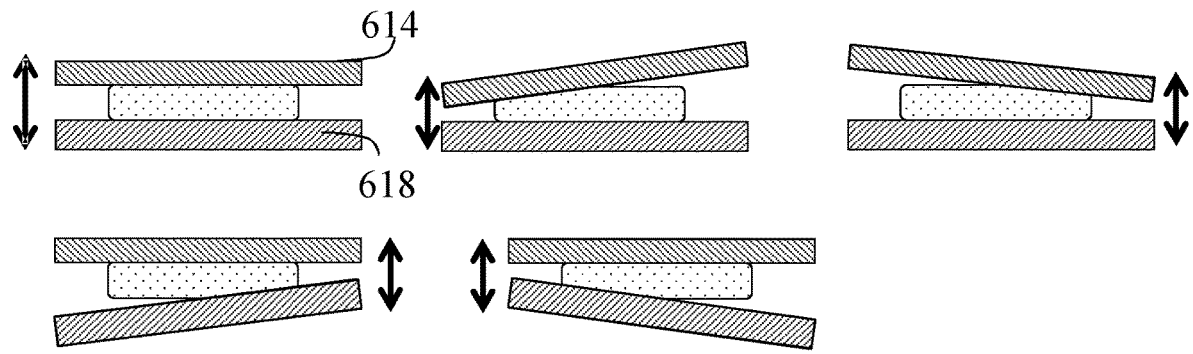

FIG. 6 shows a schematic diagram of an apparatus 600 comprising viscosity-changing device 604 for preventing the formation of ice crystals during a cryopreservation process. Apparatus 600 is substantially identical to apparatus 100 of FIG. 1 except that apparatus 600 comprises a specific viscosity-changing device 604. Accordingly, like reference numerals refer to the same or similar elements. For example, the apparatus 600 comprises a temperature control device 608, temperature sensor 609, control circuitry 606, power supply 610 and storage 613, which are the same or similar to elements 108, 109, 106, 110 and 113 described above. Thus, for the sake of brevity, such elements are not described again.

In apparatus 600, the viscosity-changing device 604 is a compression device. In embodiments, the viscosity-changing device 604 is provided within, or is integral to, housing 602. The viscosity-changing device 604 comprises a first plate 614, a second plate 618, and an actuating element 616. As shown in FIG. 6, a sample container 612 may be placed in housing 602 in a space between first plate 614 and second plate 618. One or both of the first plate 614 and the second plate 618 may be moved toward each other in order to compress the sample container 612. The first plate 614 and second plate 618 may be moved in a rocking motion such that the sample container 612 is compressed in sections. The first plate 614 and/or second plate 618 is coupled to actuating element 616 which controls the motion of the plate. The actuating element 616 may be coupled to control circuitry 606, or may have dedicated control circuitry, that controls the operation of actuating element and therefore, plate 614/618.

In the embodiment of FIG. 6, the sample container 612 may be any container suitable for containing a biological sample and which can be compressed. Thus, the sample container 612 may be a malleable container, such as a cryobag or blood bag. Sample container 612 contains a biological sample and a non-Newtonian fluid as a cryopreservation medium. One or both of plate 614 and plate 618 rocks over all or part of a surface of the sample container 612. FIG. 6 shows how the plates 614 and 618 may be moved relative to each other to compress sample container 612. The rocking action causes compression of the biological sample, which induces shear thinning or shear thickening of the non-Newtonian fluid within the biological sample. A fluid is shear thickening if the viscosity of the fluid increases as shear rate increases. A fluid is shear thinning if the viscosity of the fluid decreases as shear rate increases.

The actuating element is used to control the movement of first plate 614 and/or second plate 618, including the rate of movement, amount of movement and force applied on the sample container 612. The actuating element 616 may cause the plate 614, 618 to compress sample container 612 at a rate and force suitable for inducing a change in viscosity within the biological sample. The force applied by plate 614, 618 may be anything from (and including) 0.5N up to (and including) 20N, for example. In particular embodiments, the plate 614, 618 may impart a force relative to the volume of the sample/size of the sample container 612, e.g. between 1N and 2N per millilitre. In embodiments, the speed of movement and/or force required to induce a change in viscosity suitable to prevent ice crystal formation may vary with temperature. Thus, plate 614, 618 may be moved by an actuating element at different speeds (or to apply different forces) for different samples, different processes (warming or cooling) or different points within a warming/cooling process.

In embodiments of the apparatuses shown in FIGS. 2 to 6, the temperature control device may be provided entirely or partly within the viscosity-changing device. For example, in embodiments of apparatus 200, the temperature control device 208, or a part of temperature control device 208, may be incorporated within rod 218 of the viscosity-changing device 204. This may enable the rod 218 to induce changes in viscosity of the biological sample, and to change the temperature of the biological sample. This may be particularly useful in embodiments where the rod 218 becomes trapped within a cooled, solidified biological sample 214 during a cryopreservation process. In this scenario, a temperature control device within rod 218 may be able to heat the biological sample (when required) from within the sample, and the rod 218 may be able to move to perform the tapping process to induce the change in viscosity sooner than when the warming process is externally-applied. Similarly, the paddle 320, the cylinder 418, the roller 514, the plate 614 and/or plate 618 may comprise a temperature control device 20, such that a biological sample may be at least partly cooled/warmed by viscosity-changing device.

Figure 7:
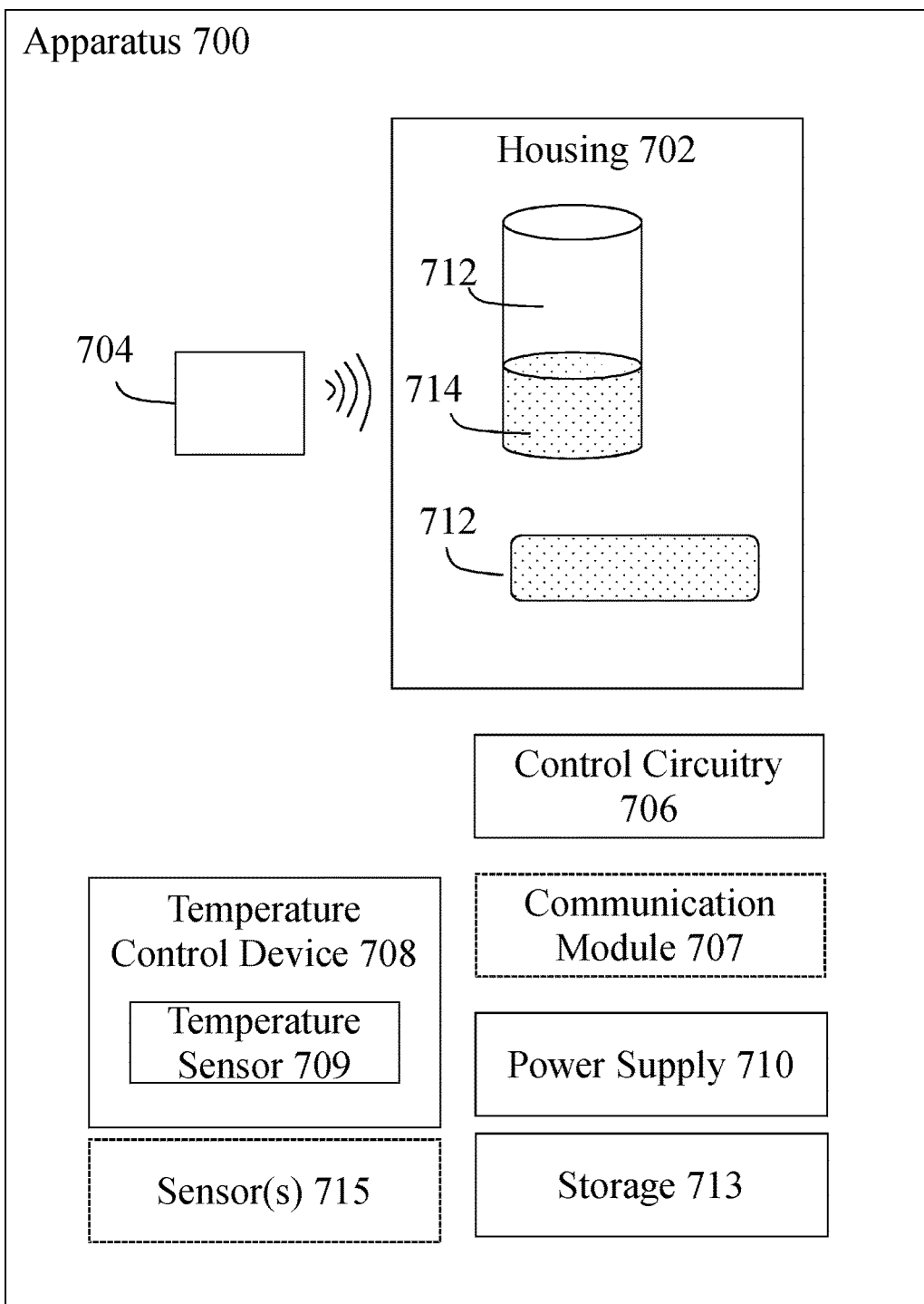
FIG. 7 shows a schematic diagram of an apparatus comprising a sound generating device to prevent ice crystal formation.

FIG. 7 shows a schematic diagram of an apparatus 700 comprising viscosity-changing device 704 for preventing the formation of ice crystals during a cryopreservation process. Apparatus 700 is substantially identical to apparatus 100 of FIG. 1 except that apparatus 700 comprises a specific viscosity-changing device 704. Accordingly, like reference numerals refer to the same or similar elements. For example, the apparatus 700 comprises a temperature control device 708, temperature sensor 709, control circuitry 706, power supply 710 and storage 713, which are the same or similar to elements 108, 109, 106, 110 and 113 described above. Thus, for the sake of brevity, such elements are not described again.

In apparatus 700, the viscosity-changing device 704 is a sound generating device. In embodiments, the viscosity-changing device 704 is provided within, or is integral to, housing 702. In embodiments, the sound generating device 704 is provided in the vicinity of housing 702, as shown in FIG. 7. The sound generating device 704 produces sound waves at particular frequencies which are capable of inducing a change in viscosity within a biological sample. For example, the sound generating device 704 may generate ultrasound waves having a particular frequency and amplitude that induces a viscosity change when the sound waves pass through the biological sample. The sound generating device 704 may be coupled to control circuitry 706, to control the frequency and amplitude of the generated waves. An advantage of this embodiment of the invention is that the technique can be used with any type of sample container 712.

In the embodiment of FIG. 7, the sample container 712 may be any container suitable for containing a biological sample 714. For example, sample container 712 may be a cryovial, cryobag, microfuge tube, medical vial, centrifuge tube, etc. Sample container 712 contains a biological sample and a non-Newtonian fluid as a cryopreservation medium. The sound waves generated by sound generating device 704 induce shear thinning or shear thickening of the non-Newtonian fluid within the biological sample. A fluid is shear thickening if the viscosity of the fluid increases as shear rate increases. A fluid is shear thinning if the viscosity of the fluid decreases as shear rate increases.

Figure 8:
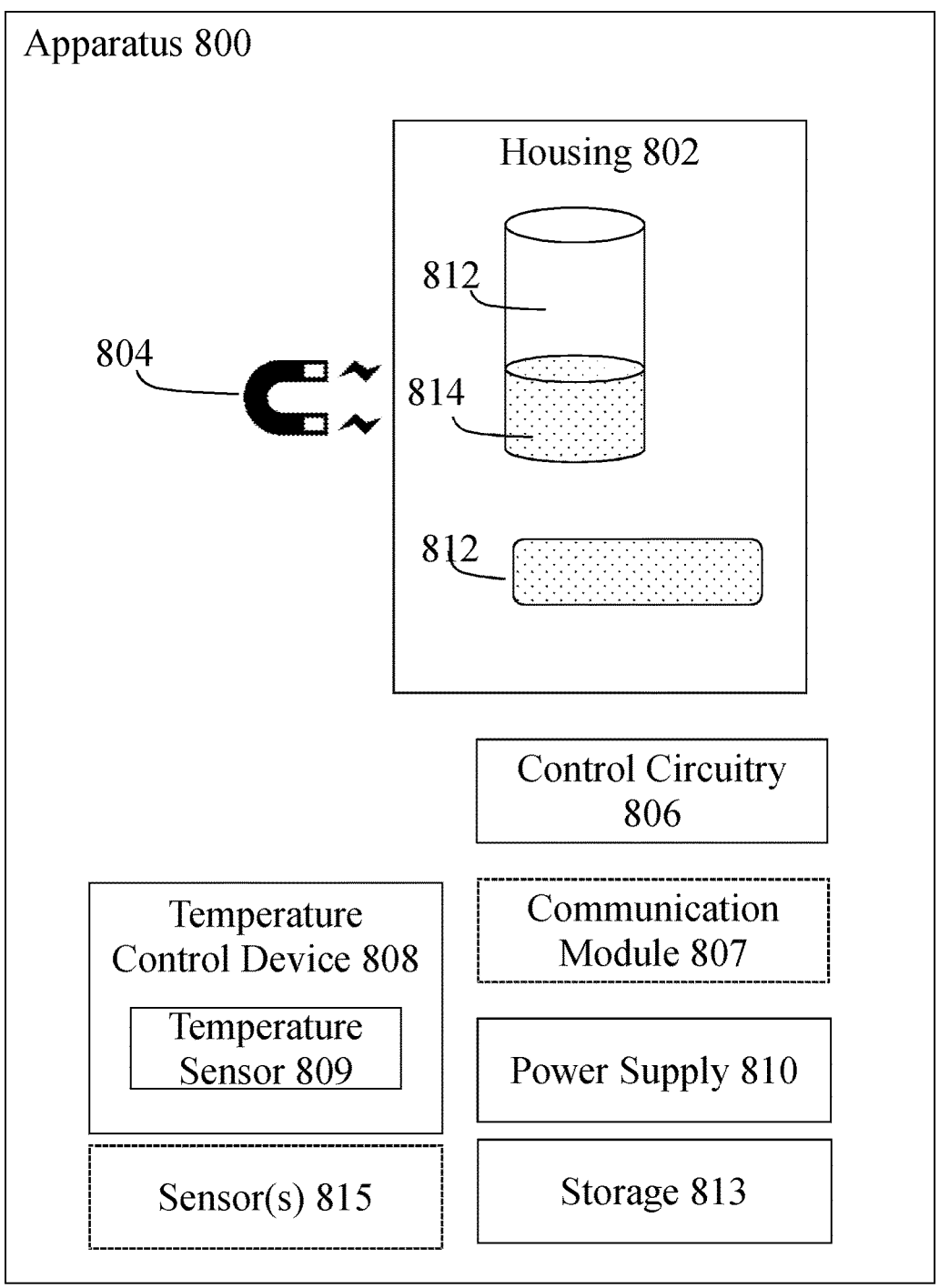
FIG. 8 shows a schematic diagram of an apparatus comprising a magnetic field generating device to prevent ice crystal formation.

FIG. 8 shows a schematic diagram of an apparatus 800 comprising viscosity-changing device 804 for preventing the formation of ice crystals during a cryopreservation process. Apparatus 800 is substantially identical to apparatus 100 of FIG. 1 except that apparatus 800 comprises a specific viscosity-changing device 804. Accordingly, like reference numerals refer to the same or similar elements. For example, the apparatus 800 comprises a temperature control device 808, temperature sensor 809, control circuitry 806, power supply 810 and storage 813, which are the same or similar to elements 108, 109, 106, 110 and 113 described above. Thus, for the sake of brevity, such elements are not described again.

In apparatus 800, the viscosity-changing device 804 is a magnetic field generating device. In embodiments, the viscosity-changing device 804 is provided within, or is integral to, housing 802. In embodiments, the magnetic field generating device 804 is provided in the vicinity of housing 802, as shown in FIG. 8. The device 804 produces magnetic fields or electromagnetic fields having field strengths which are capable of inducing a change in viscosity within a biological sample. The device 804 may comprise a magnet or electromagnet provided in proximity to housing 802, or all around housing 802. The magnetic or electromagnetic field strength may be varied by device 804, to ensure that a required viscosity is induced. The device 804 may be coupled to control circuitry 806, to control the frequency and amplitude of the generated waves. An advantage of this embodiment of the invention is that the technique can be used with any type of sample container 812.

In the embodiment of FIG. 8, the sample container 812 may be any container suitable for containing a biological sample 814. For example, sample container 812 may be a cryovial, cryobag, microfuge tube, medical vial, centrifuge tube, etc. Sample container 812 contains a biological sample and a non-Newtonian fluid as a cryopreservation medium. The cryopreservation medium may be ferrous or otherwise affectable by magnetic or electromagnetic fields. The fields generated by device 804 induce shear thinning or shear thickening of the non-Newtonian fluid within the biological sample. A fluid is shear thickening if the viscosity of the fluid increases as shear rate increases. A fluid is shear thinning if the viscosity of the fluid decreases as shear rate increases.

Embodiments of the present techniques also provide a non-transitory data carrier carrying code which, when implemented on a processor, causes the processor to carry out the methods described herein.

The techniques further provide processor control code to implement the above-described methods, for example on a general purpose computer system or on a digital signal processor (DSP). The techniques also provide a carrier carrying processor control code to, when running, implement any of the above methods, in particular on a non-transitory data carrier or on a non-transitory computer-readable medium such as a disk, microprocessor, CD- or DVD-ROM, programmed memory such as read-only memory (firmware), or on a data carrier such as an optical or electrical signal carrier. The code may be provided on a (non-transitory) carrier such as a disk, a microprocessor, CD- or DVD-ROM, programmed memory such as non-volatile memory (e.g. Flash) or read-only memory (firmware). Code (and/or data) to implement embodiments of the techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

Computer program code for carrying out operations for the above-described techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be realised in the form of a data carrier having functional data thereon, said functional data comprising functional computer data structures to, when loaded into a computer system or network and operated upon thereby, enable said computer system to perform all the steps of the above-described method.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from the any inventive concept as defined in the appended claims.

The invention claimed is:

1. An apparatus for preventing the formation of ice crystals during a cryopreservation process, the apparatus comprising:
   a housing;
   a container containing a biological sample and a non-Newtonian fluid as a cryopreservation medium; and
   a device for inducing a change in viscosity of the cryopreservation medium, wherein the device for inducing a change in viscosity of the cryopreservation medium induces shear thickening and/or shear thinning in the cryopreservation medium,
   wherein the container is arranged in the housing, and
   wherein the device for inducing a change in viscosity of the cryopreservation medium is integral to the housing.

2. The apparatus according to claim 1, wherein the device comprises:
   a tapping device for applying a force to the biological sample in the container.

3. The apparatus according to claim 2, wherein the tapping device comprises:
   at least one rod; and
   an actuating element coupleable to the at least one rod to raise and lower the rod into proximity with a surface of the biological sample in the container.

4. The apparatus according to claim 3, wherein the rod impacts the surface of the biological sample.

5. The apparatus according to claim 3, wherein the rod impacts a surface of the container.

6. The apparatus according to claim 3, wherein the rod impacts an intermediate layer provided between the rod and the surface of the biological sample.

7. The apparatus according to claim 3, wherein the tapping device comprises:
   a plurality of rods; and
   at least one actuating element coupleable to the plurality of rods to raise and lower the rods into proximity with a surface of the biological sample in the container.

8. The apparatus according to claim 3, wherein at least a portion of the or each rod is formed from any one of: aluminium, titanium, titanium oxide, fibreglass, plastic, polypropylene, polycarbonate, metal, metal alloy, or a medical-grade material.

9. The apparatus according to claim 1, wherein the device comprises a piston for applying a force to the biological sample in the container.

10. The apparatus according to claim 9, wherein a volume in the container between the piston and the biological sample is filled with an additional fluid.

11. The apparatus according to claim 10, wherein the additional fluid is any one of: a gas, air, nitrogen, carbon dioxide, argon, a liquid, or oil.

12. The apparatus according to claim 1, wherein the device comprises:
   a rotating device for applying a rotational force to the biological sample in the container; and
   an actuating element coupleable to the rotating device to rotate within the biological sample in the container.

13. The apparatus according to claim 12, wherein the rotating device comprises a paddle or a propeller that is at least partly inserted into the biological sample.

14. The apparatus according to claim 12, wherein the rotating device comprises a cylinder that is at least partly inserted into the container.

15. The apparatus according to claim 14, wherein the cylinder rotates within the container.

16. The apparatus according to claim 15, wherein the actuating element is coupleable to the container and causes the container to rotate relative to the cylinder.

17. The apparatus according to claim 12, wherein at least a portion of the rotating device is formed from any one of: aluminium, titanium, titanium oxide, fibreglass, plastic, polypropylene, polycarbonate, metal, metal alloy, or a medical-grade material.

18. The apparatus according to claim 1, wherein the device comprises:
   a compression device for compressing the biological sample in the container; and
   an actuating element coupleable to the compression device to operate the compression device.

19. The apparatus according to claim 18, wherein the compression device comprises:
   a guide rail; and
   a roller coupled to the guide rail.

20. The apparatus according to claim 19, wherein the container is placed in the housing and the roller is moved across a surface of the container to compress the biological sample.

21. The apparatus according to claim 18, wherein the compression device comprises:
   a first moveable plate; and
   a second plate provided in parallel to the first moveable plate;
   wherein the container is sandwiched in a space between the first moveable plate and the second plate.

22. The apparatus according to claim 21, wherein the actuating element moves the first moveable plate relative to the second plate to compress the container.

23. The apparatus according to claim 22, wherein the second plate is a moveable plate, and wherein the actuating element moves the second plate relative to the first moveable plate to compress the container.

24. The apparatus according to claim 1, wherein the device is a sound generating device for generating sound waves that are directed through the container and biological sample.

25. The apparatus according to claim 24, wherein the sound generating device generates ultrasound waves.

26. The apparatus according to claim 1, wherein the device is a magnetic field generating device comprising a permanent magnet.

27. The apparatus according to claim 1, wherein the device is an electromagnetic field generating device.

28. The apparatus according to claim 1, wherein the cryopreservation process is a cooling process to cryopreserve the biological sample, and the apparatus comprises a temperature control device to cool the biological sample.

29. The apparatus according to claim 28, wherein the container is removable from the apparatus when the cooling process is complete and stored in an external storage device.

30. The apparatus according to claim 29, wherein the container remains within the apparatus when the cooling process is complete.

31. The apparatus according to claim 28, wherein the temperature control device cools the biological sample to one of: −80° C., −100° C., −120° C., or −150° C.

32. The apparatus according to claim 28, wherein the temperature control device comprises at least one of: a Stirling engine cooler, and a coolant-based cooling system.

33. The apparatus according to claim 1, wherein the cryopreservation process is a heating process to liquify the biological sample, and the apparatus comprises a further temperature control device to heat the biological sample.

34. The apparatus according to claim 33, wherein the container is removable from the apparatus when the heating process is complete.

35. The apparatus according to claim 33, wherein the further temperature control device heats the biological sample to a temperature equal to or above an equilibrium melting point of the biological sample.

36. The apparatus according to claim 33, wherein the further temperature control device comprises at least one of: a resistive wire/resistive element, a passive warming system, and a fluid-based warming system.

37. The apparatus according to claim 1, further comprising a temperature sensor.

38. The apparatus according to claim 1, further comprising an ice detector.

39. The apparatus according to claim 38, wherein the ice detector comprises a light emitter and light detector.

40. The apparatus according to claim 38, wherein the ice detector comprises an electrical sensor for detecting changes in resistance or conductance in the biological sample.

41. A method for preventing the formation of ice crystals during a cryopreservation process, the method comprising performing the cryopreservation process using the apparatus according to claim 1 to induce a change in viscosity of the non-Newtonian cryopreservation medium.

* * * * *